No. 832,076. PATENTED OCT. 2, 1906.
H. W. OSTER.
DIE CUTTER.
APPLICATION FILED MAY 15, 1905.
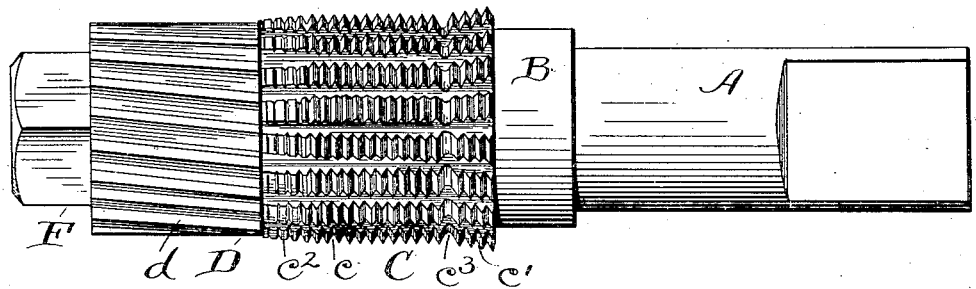
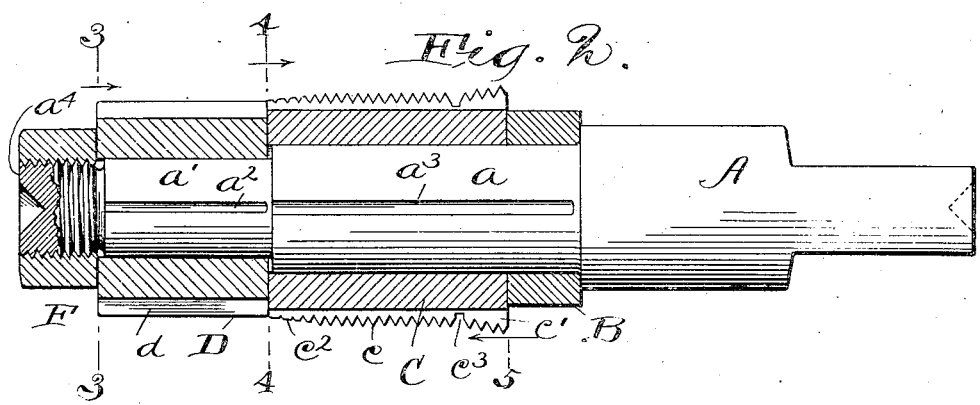
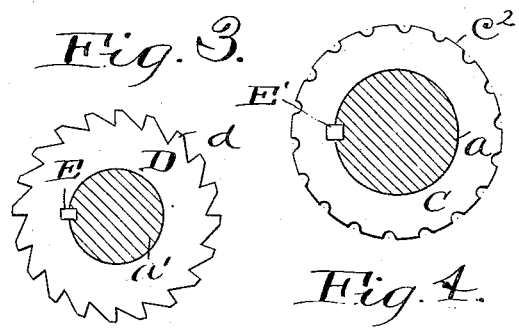
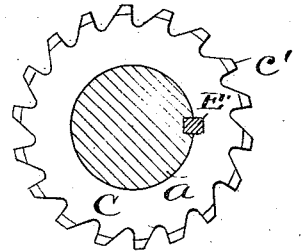
Witnesses.
E. B. Gilchrist
N. L. Brennan
Inventor.
Herman W. Oster,
By his Attorneys,
Thurston & Bates

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

DIE-CUTTER.

No. 832,076.     Specification of Letters Patent.     Patented Oct. 2, 1906.

Application filed May 15, 1905. Serial No. 260,375.

*To all whom it may concern:*

Be it known that I, HERMAN W. OSTER, a citizen of the United States, residing at Cleveland, in the county of Cuyahoga and State of Ohio, have invented a certain new and useful Improvement in Die-Cutters, of which the following is a full, clear, and exact description, reference being had to the accompanying drawings.

The object of this invention is to provide an effective tool for cutting the threads of dies used in die-stocks.

It is desirable that the threaded end of each die shall be concave to correspond with the curvature of the pipe or rod to be threaded and that the threads shall taper rapidly away from the pipe at that edge of the die which first encounters the pipe, so that these threads, called "roughing-threads," may be effective in removing the scale or other unevenness from the pipe. As these roughing-threads, however, start the cut, it is necessary that they be formed as an accurate continuation of the main threads. The tool I have provided for making these dies consists of a peculiarly-formed cutter adapted to be rotated on its axis and operate on one or more dies placed radially thereto. The cutter consists of three sections—first, a roughing-section, then a main screw-threading section, and then a tapered screw-threading section. The screw-threading part of the cutter is made with spiral or helical threads, and one thread is preferably omitted between the main portion and the tapered portion. The threading of the tapered portion, however, is so placed as to be a continuation of the helical thread of the cutter. The cutter is clearly shown in the drawings, wherein—

Figure 1 is a side elevation thereof. Fig. 2 is a longitudinal section; and Figs. 3, 4, and 5 are cross-sections on the correspondingly-numbered lines of Fig. 2, these views being taken in the direction of the arrows on such lines.

Referring to the parts by letters, A represents a suitable spindle adapted to be held in a machine of the general character of a milling-machine and rotated. Surrounding this spindle on a reduced portion $a$ thereof is, first, a collar B, and then the screw-threading portion of the cutter C. In front of the screw-threading cutter C is a cylindrical reamer D, which surrounds a further reduced portion $a'$ of the spindle. These parts are held against independent rotation by suitable keys E and E', which occupy keyways $a^2$ and $a^3$, respectively, in the spindle. The cutters are held in place against longitudinal displacement by a nut F, screwing onto the threaded end $a^4$ of the spindle. By having the spindle of different diameters, as shown, the cutter and reamer each have a driving fit on the spindle, preventing any looseness in the tool.

The roughing or reaming cutter D is generally cylindrical, but has longitudinal and slightly diagonal teeth $d$, as shown. The threading part of the cutter C consists, essentially, of a cylindrical screw-threading portion $c$ and a tapered screw-threading portion $c'$, though these portions are preferably made of the same piece of metal. At the forward end of the portion $c$ the points of the threads are cut off to bring the cutter gradually to the same outside diameter at this point as the cutter D. This allows the threading operation to follow immediately and as a continuation of the reaming operation. The tapering threads $c'$ are a continuation of the same helix which makes the threads $c$; but between these two portions a thread is omitted at $c^3$, so that there will be no dulling of the thread cut, as might result if the tapered threads ran directly into the cylindrical threads.

My cutter is especially well adapted for use with a traveling carriage to which dies are clamped on opposite sides of the cutter and at an angle to a plane normal to the axis thereof. When the dies are so held, the threads cut by the cylindrical portion $c$ of the cutter are such that they present a tapered face when the dies are held in the same plane in the die-stock, the threads cut by the portion $c'$ presenting a much more pronounced taper. Such a machine, designed to employ the cutter forming the subject-matter of this application, is shown in my application, Serial No. 255,884, filed April 17, 1905, though the cutter is not limited to use with that particular machine.

I claim—

1. A cutter comprising a cylindrical screw-threading portion and a tapered screw-threading portion having its smaller end adjacent to the cylindrical portion, both of said portions being formed on a continuous helix and one thread being omitted at the junction.

2. In a cutter, the combination of a spindle having a reduced portion, a collar fitted on said reduced portion and bearing against the shoulder thus provided, a threader having spiral cutting-teeth and fitted on said reduced portion against said collar, a further reduced portion of the spindle which the threader slightly overhangs, a reamer fitted on such last-mentioned portion and abutting against the threader, and a nut screw-threaded on the end of the spindle and bearing against said reamer.

In testimony whereof I hereunto affix my signature in the presence of two witnesses.

HERMAN W. OSTER.

Witnesses:
ALBERT H. BATES,
W. L. McGARRELL.